United States Patent [19]

Smith

[11] 4,002,424

[45] Jan. 11, 1977

[54] SOLUTION OF ISOMER MIXTURE OF NAPHTHYLAZOPHENYLAZONAPHTHYL DISULFONATE DYE

[75] Inventor: Sanford Byrom Smith, Hockessin, Del.

[73] Assignee: E. I Du Pont de Nemours and Company, Wilmington, Del.

[22] Filed: June 14, 1973

[21] Appl. No.: 369,816

[52] U.S. Cl. .............................................. 8/26; 8/7; 8/41 R; 8/50; 8/85 A; 8/88; 162/162; 260/177; 260/178; 260/184; 260/190; 260/196

[51] Int. Cl.$^2$ .................... C09B 31/02; D06P 1/00; D06P 1/615; D21H 1/46

[58] Field of Search ............. 8/26, 85, 88; 260/190, 260/184, 177

[56] References Cited

UNITED STATES PATENTS

| | | | |
|---|---|---|---|
| 1,873,606 | 8/1932 | Lange et al. ..................... 260/190 |
| 2,536,957 | 1/1951 | Riat et al. ........................ 260/148 |
| 3,232,693 | 2/1966 | Lange et al. ........................... 8/26 |
| 3,310,552 | 3/1967 | Ischer ............................. 260/200 |
| 3,635,944 | 1/1972 | Litke ............................... 260/191 |
| 3,643,269 | 2/1972 | Schweizer .................. 260/175 X |
| 3,676,050 | 7/1972 | James ......................... 260/191 X |
| 3,679,353 | 7/1972 | Streck ........................ 260/208 X |
| 3,681,320 | 8/1972 | Franklin ......................... 260/175 |
| 3,701,624 | 10/1972 | Franklin ................................ 8/7 |
| 3,723,056 | 3/1973 | Litke .................................. 8/26 |

FOREIGN PATENTS OR APPLICATIONS

| | | | |
|---|---|---|---|
| 126,692 | 11/1949 | Sweden ........................... 260/190 |
| 1,056,524 | 1/1967 | United Kingdom .............. 260/153 |
| 1,176,898 | 1/1970 | United Kingdom .............. 260/190 |

OTHER PUBLICATIONS

Colour Index, 3rd Edition, vol. 4, p. 4254, 27915 (1971).

*Primary Examiner*—Floyd D. Higel
*Attorney, Agent, or Firm*—James A. Costello

[57] ABSTRACT

Solution of a mixture of isomers of naphthylazophenylazonaphthyl dye containing two sulfonate substituents, the solution comprising said dye, water, triethanolamine, lithium base and urea. The dyes have good solubility and substantivity and are useful among other things, for dyeing cellulosic substrates.

7 Claims, No Drawings

SOLUTION OF ISOMER MIXTURE OF NAPHTHYLAZOPHENYLAZONAPHTHYL DISULFONATE DYE

BACKGROUND OF THE INVENTION

This invention concerns substituted naphthylazophenylazonaphthyl dyes and dye solutions.

Liquid dyes which can be pumped and measured with greater ease than powdered dyes find application wherever continuous dyeing processes are operated, as in the dyeing of paper. The best liquid dyes are true solutions which avoid difficulties with settling, a problem with thin liquid suspensions. Prior art dye solutions usually require isolation of the dye as a filter press cake before it is dissolved in a solvent or solvent mixture. The filtration rids the dye of some organic impurities as well as salts which are generated in the synthesis and tend to repress solubility of the dye itself. The composition of the instant invention provides a true dye solution containing at least 10% of dye, and can be attained without isolation of the dye from the reaction mass in which it is produced.

SUMMARY OF THE INVENTION

The novel dyes of this invention comprise at least two mixed isomers of the formula

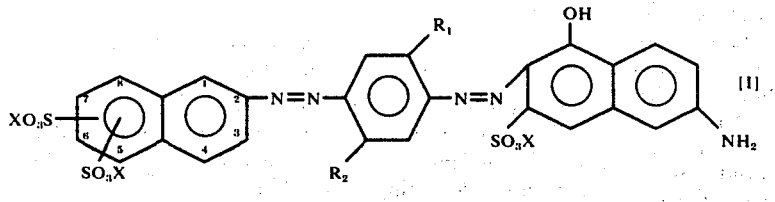

wherein the isomers differ from each other in the location of at least one of the two -$SO_3X$ substituents on the naphthyl radical, said substituents being located in at least two of the following three locations, the 4,8 positions, the 6,8 positions and the 5,7 positions, each of two of the isomers being present in the amount of at least 25% by weight of the mixed isomers, and wherein $R_1$ and $R_2$ are independently H, or alkyl or alkoxy of 1 to 2 carbons, and X is a cation selected from the group consisting of $Na^+$, $Li^+$, $K^+$ and $(HOC_2H_4)$ n- $N^+H_{4-n}$ where n is 2 or 3. preferred dyes are those wherein $R_1$ is methoxy, $R_2$ is methyl, and X is a mixture of $Li^+$ and $(HOC_2H_4)_3NH$.

The novel dyes can be isolated in pure, dry form from the liquid reaction solution in which they are made. Alternatively, the dyes can be in the form of the liquid reaction solution. The expression "dyes" as employed herein to designate the subject matter of this invention, depending upon the context in which the term is used, refers to the isolated form of the dye, or to the liquid reaction solution, or to both.

The dye solutions of this invention comprise a solution (single phase) of at least two mixed isomers [I] of this invention, water, triethanolamine, a lithium base, and urea, the mixed isomers being at least about 10% by weight of the solution.

It is impossible to give the exact composition of the dye solutions because of the numerous cation/anion pairings that are possible. However, the dye solutions are identifiable as having from about 10 to 20% dye, as free acid, from about 5 to 15% urea, from about 60 to 75% water, and a balance of ingredients up to about 25%, all based on weight of the solution. In addition, there will be no more than about 5 weight percent of sodium chloride present.

The following recited preferred and most preferred compositions present the most complete characterizations of the dye solutions that is fairly possible to provide. The characterizations are in terms of the most significant of the solution constituents. Preferred:

10–20% dye as free acid
5–15% urea
5–15% $HN(C_2H_4OH)_3^+$
0.2–2.0% $Na^+$
0.1–2.0% $Li^+$
60–75% $H_2O$ and most preferred:
12–15% dye as free acid
8–10% urea
8–12% $HN(C_2H_4OH)_3^+$
0.4–0.6% $Na^+$
0.2–1.0% $Li^+$
65–72% water.

DETAILS OF THE INVENTION

The dye solutions of this invention are prepared in these four steps: (1) diazotizing a mixture containing at least two isomeric naphthylaminedisulfonic acids selected from 2-naphthylamine-4,8-disulfonic acid (C acid), 2-naphthylamine-6,8-disulfonic acid (amino G acid) and 2-naphthylamine-5,7-disulfonic acid (amino J acid), (2) coupling the resulting mixed diazo to an intermediate amino compound, (3) isolating the mixed monoazo intermediate, (4) diazotizing and coupling the intermediate to 6-amino-1-naphthol-3-sulfonic acid (J acid).

The mixed isomers can be prepared in dry form by isolation from the solution reaction mass obtained after step (4) above. As will be understood by those skilled in the art, a typical method for isolation comprises drying the composition on a drum dryer or in a spray dryer. Alternatively, the dye may be salted out of solution by adding sufficient sodium chloride to precipitate the dye, followed by filtration and drying of the filter cake. The latter method of course leaves considerable sodium chloride in the dye after final drying. It should be realized that when the dye is salted out, the addition of urea would not be made.

Intermediate amino compounds that can be employed in step 2 include aniline, cresidine (5-methyl-o-anisidine), ortho- and meta-anisidine, ortho- and meta-toluidine, meta-aminophenol, 4-methoxy-2-aminotoluene, 2,5-dimethoxy- aniline, 2,5-diethoxyaniline, 2,5-dimethylaniline, and 2,5-diethylaniline. Variations in shade of the product can be obtained by employing various of the intermediates mentioned including mixtures thereof.

In step 4, a lithium base is employed as acid acceptor, and triethanolamine as a buffer to maintain pH at from about 10.5 to 8.5 during the coupling. Triethanolamine or diethanolamine and finally urea can be employed as solution stabilizers after the coupling. The reaction product is a solution containing at least 10% of the dye component. Heretofore, dyes of high aqueous solubility would be expected to lack substantivity for cellulosic substrates and to remain in solution rather than attaching to the cellulosic molecule. Surprisingly, in the dye compositions of this invention both high solubility and substantivity are attained.

It is noted that the properties of good solubility and substantivity are obtained only with a mixture of isomers as heretofore explained. These properties are not achieved with dye mixtures employing a single naphthalene disulfonate component with several different benzene derived components or different monosulfonate naphthalene couplers. These latter two components can be varied to obtain different shades of color or other properties, but the more important solubility characteristics are obtained only with the mixture of disulfonates. Adequate solubility is found with bicomponent mixtures containing isomer ratios of from about 3:1 to 1:3. Solubility tends to be unsatisfactory outside these limits. Where a mixture of 3 isomers is employed, at least two should be present in at least 25% of the total weight of the isomer.

The process described above provides an economical method for producing violet dye solutions. The solutions can be obtained by separate diazotization and coupling of the individual isomers by the techniques disclosed, followed by mixing of the products. Additionally, the disclosed solution compositions can be prepared by more conventional processes of isolating the dyes, either individually or as a mixture, followed by washing to remove any excess salt that would lessen ultimate solubility, and dissolution of the dyes in water containing triethanolamine, lithium base and urea.

The dye solutions of the invention are stable and can be stored for 6 months or more without precipitation of solid dye or change of dyeing properties. The solutions are useful in dyeing cellulosic materials, including cotton, but especially paper. The properties of light and wet fastness, substantivity and bleed fastness are good. When used to dye cotton, the resultant shade is similar to that obtained on paper. The dye solutions of the invention are particularly useful in the continuous dyeing of paper where the ease of handling and metering offers definite advantages over the older powder types. The dye solution can be metered directly into the paper pulp slurry at a point after the last refiners in the system. This procedure eliminates the color contamination of beater chest, machine chest and other equipment which normally occurs in batch dyeing where dye is usually added at an earlier point in the process. Control of shade is rapid and efficient, and changes of shade can be made quickly because only a small part of the system is occupied by color or colored fibers.

DESCRIPTION OF THE PREFERRED EMBODIMENTS

The following Examples are meant to illustrate but not to limit this invention.

EXAMPLE 1

Preparation of Monoazo Intermediate, Steps 1 and 2

In a vessel containing 750 parts of water were charged 60.7 parts of amino G acid salt and 65.1 parts of C acid. A thin, cream colored slurry resulted. To the thin slurry at ambient temperature was added 25.6 parts of HC1 as a 31% aqueous solution. The charge was then adjusted to 1200 parts total by adding water, and the temperature adjusted to 16° to 18° C. About 28.4 parts of sodium nitrite was then added gradually in the form of a 31.5% solution, allowing the temperature to rise to about 28° C. After about 1 hour at 28° C., the slight excess of sodium nitrite was destroyed by adding a little sulfamic acid.

Meanwhile, in another vessel a solution was prepared of 215 parts of water and 17.2 parts of HC1 as a 31% aqueous solution (55.1 parts, net), and to it were added 55.0 parts of cresidine. The charge was agitated and warmed to 42° C. to dissolve the cresidine. The cresidine solution was then added to the diazo slurry over about 40 minutes, the temperature rising to 30° to 35° C. When all of the cresidine solution had been added, the strongly acid mixture was stirred for 15 minutes and pH adjusted to about 3.7 by adding caustic soda solution. The charge was then stirred at pH 3.7 and temperature of 36° to 40° C. until coupling was complete, about 4 hours. The solid product was removed by filtration, and the filter press cake washed with 1500 parts of 2% sodium chloride solution having pH of 1.0, adjusted by adding hydrochloric acid. The filter cake was blown with air to remove as much water as possible and was then removed to storage in preparation for the following step.

PREPARATION OF MIXED ISOMER DYE PRODUCT, STEPS 3 and 4

Into a vessel were charged 60.75 parts of water and 22.58 parts of 100% product obtained as a press cake above. The press cake contained about 34.5% solids, the remainder being water. The total parts of material in the reaction vessel at this point was about 127 parts. The charge was stirred for several hours until it was a smooth homogeneous surry, free of lumps. Next was added 2.52 parts of HC1 in the form of a 30% equeous solution, and the temperature adjusted to 30° to 35° C. A small amount (0.01 part) of ethoxylated fatty alcohol anti-foam agent was added at this point. With temperature maintained at 30° to 35° C., 3.66 parts of 100% sodium nitrite was added as a 30% aqueous solution over a period of about ½ hour. Excess nitrite was maintained for at least 1 hour, more being added as necessary. The charge was then cooled to about 15° C.

The J acid coupler solution was prepared in a second vessel by adding 28.1 parts of water, 13.16 parts of 100% J acid and stirring for about 45 minutes at 8° to 12° C. to obtain a smooth slurry. The thick slurry was solubilized by stirring in 3.82 parts of lithium hydroxide monohydrate to attain a pH of about 9.5. The temperature was allowed to rise to 19° C. Next was added 27.5 parts of triethanolamine, maintaining temperature at 16° to 20° C.

Coupling was carried out by adding the diazo slurry to the coupler solution over about 45 minutes with reaction temperature at 16° to 20° C. After the charge was all in one vessel it was stirred for 3 hours to complete the reaction. The temperature was allowed to rise at will, but not above 30° C., while pH dropped to about 8.8.

There was then added 27.2 parts of urea, and the mass was heated to 70° to 75° C., held at that temperature for one hour and cooled to about 35° C. The charge was standardized by making dye test comparisons with a standard dye of known strength, water being added as indicated. Before packaging, the solution was filtered through a line filter to remove trace amounts of solid material. The dye liquid was employed to dye cellulosic material to a brilliant violet color.

EXAMPLE 2 (Comparison)

In this Example the general procedure of Example 1 was followed for preparation of three dye solutions. One preparation (a) employed 10.6 parts of C acid which was coupled to 4.8 parts of cresidine, and 4.52 parts of the product diazotized and coupled to 2.63 parts of J acid.

In the second preparation (b) 15.15 parts of amino G acid salt was diazotized and coupled to 6.86 parts of cresidine following the same procedure as in 2(a). Then 4.52 parts of the product was diazotized and coupled to 2.63 parts of J acid to form a second type dye product.

In the third preparation (c) 4.52 parts of the monoazo intermediate obtained in Example 1(a) was diazotized and coupled to 2.63 parts of J acid as in 2(a) and 2(b).

After the final coupling and addition of 5.4 parts urea (as in Example 1), and adjustment to equal weight both (a) and (b) preparations contained a large amount of solid material, while parparation (c) was a clear solution with 13.17% active dye ingredient and strength equal to the set standard as measured by spectrophotometer. After removal of the solids from the (a) and (b) preparations, (a) solutions had a strength of only 76% of standard and (b) solution had a strength of only 59% of standard.

This Example illustrates that the composition of the invention, represented by the (c) preparation, provides high strength dye solutions not obtainable when a single isomer naphthalenedisulfonic acid starting material is used.

EXAMPLE 3

A portion of the monoazo intermediate as prepared in Example 1, steps 1 and 2 was diluted with water to form a slurry containing 45.5 parts of the organic monoazo mixture and 324 parts of water. To the slurry were added 5.28 parts of HCl as 37.5% aqueous solution, then 8.58 parts of $NaNO_2$ as 31.5% aqueous solution with temperature maintained at 25°–30° C. After one hour the residual nitrous acid was discharged by adding a little sulfamic acid and the diazo slurry was divided into two halves of 195 parts each.

A 165 part portion of the diazo was then added to a solution containing 26.3 parts of J acid over 45 minutes. The pH in the J acid reactor was held at 7.0-7.5 by simultaneous addition of triethanolamine, and temperature was maintained at about 20° C. After the addition was complete the charge was held at 20° and pH 7.5 for 8 hours. There was obtained 252 parts of dye solution.

The embodiments of the invention in which an exclusive property or privilege is claimed are defined as follows:

1. A dye solution consisting essentially of two or three mixed isomers, water, triethanolamine, a lithium base, and urea, wherein the mixed isomers are at least 10% by weight of the solution and have the formula

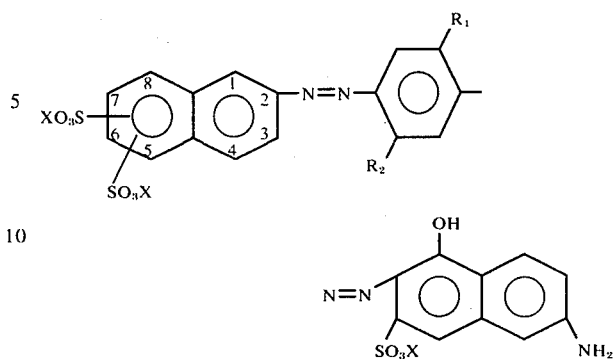

wherin the isomers differ from each other in the location of at least one of the two $-SO_3X$ substituents on the naphthyl radical, said substituents being located in at least two of the following three locations, the 4,8 positons, the 6,8 positions and the 5,7 positions, each of two of the isomers being present in the amount of at least 25% by weight of the mixed isomers, and wherein $R_1$ and $R_2$ are independently H, or alkyl or alkoxy of 1 to 2 carbons, and X is a cation selected from the group consisting of $Na^+$, $Li^+$, $K^+$ and $(HOC_2H_4)_n\text{-}N^+H_{4-n}$ where n is 2 or 3.

2. A dye solution according to claim 1 wherein there are two mixed isomers, the isomers being present in the ratio of about 3:1 to 1:3.

3. A dye solution according to claim 1 wherein there are three mixed isomers, at least two of the isomers being present in at least about 25% of the total weight of the isomer.

4. A dye solution according to claim 2 wherein the mixed isomers have $-SO_3X$ substituents in the 4,8 and 6,8 positions on the naphthyl radical, the solution constituents comprising
   10–20% dye as free acid
   5–15% urea
   5–15% $HN(C_2H_4OH)_3^+$
   0.2–2.0% $Na^+$
   0.1–2.0% $Li^+$, and 60–75% water.

5. A dye solution according to claim 2 wherein the mixed isomers have $-SO_3X$ substituents in the 4,8 and 5,7 positions on the naphthyl radical, the solution constituents comprising
   10–20% dye as free acid
   5–15% urea
   5–15% $HN(C_2H_4OH)_3^+$
   0.2–2.0% $Na^+$
   0.1–2.0% $Li^+$, and
   60–75% water.

6. A dye solution according to claim 2 wherein the mixed isomers have $-SO_3X$ substituents in the 6,8 and 5,7 positions on the naphthyl radical, the solution constituents comprising
   10–20% dye as free acid
   5–15% urea
   5–15% $HN(C_2H_4OH)_3^+$
   0.2–2.0% $Na^+$
   0.1–2.0% $Li^+$, and
   60–75% water.

7. A dye solution according to claim 3 wherein the mixed isomers have $-SO_3X$ substituents in the 4,8, 6,8 and 5,7 positions on the naphthyl radical, the solution constituents comprising
   10–20% dye as free acid
   5–15% urea
   5–15% $HN(C_2H_4OH)_3^+$
   0.2–2.0% $Na^+$
   0.1–2.0% $Li^+$, and
   60–75% water.

* * * * *